United States Patent [19]

Takeuchi et al.

[11] Patent Number: 4,566,431

[45] Date of Patent: Jan. 28, 1986

[54] SPONTANEOUS CIRCULATION TYPE SOLAR HEAT COLLECTOR

[75] Inventors: Hirosato Takeuchi; Toshio Mikiya, both of Tokyo, Japan

[73] Assignee: Nitto Kohki Co., Ltd., Tokyo, Japan

[21] Appl. No.: 622,251

[22] Filed: Jun. 19, 1984

[30] Foreign Application Priority Data

Sep. 8, 1983 [JP] Japan .......................... 58-138438[U]

[51] Int. Cl.⁴ ............................................... F24J 3/02
[52] U.S. Cl. ..................................... 126/437; 126/443
[58] Field of Search ................ 126/433, 437, 438, 443

[56] References Cited

U.S. PATENT DOCUMENTS 3,915,147  10/1975  Rineer ................................. 126/438
4,474,170  10/1984  McConnell et al. ................. 126/433

FOREIGN PATENT DOCUMENTS 0024763  2/1983  Japan .................................... 126/443

Primary Examiner—Carroll B. Dority, Jr.
Attorney, Agent, or Firm—Birch, Stewart, Kolasch & Birch

[57] ABSTRACT

A spontaneous convection type solar heat collector arrangement including a reservoir in which a fluid is disposed. The reservoir includes an upper portion, a lower portion and an inner surface. At least one double-tubing type solar heat collecting tube having an open end and a closed end is positioned within at least one connecting opening provided in the lower portion of the reservoir. Insulating material is operatively positioned around the reservoir for protecting and insulating the reservoir. The open ends of said double-tubing type solar heat collecting tube is positioned in a fixed fluid-tight manner to the connecting opening and is mounted flush with the inner surface of the reservoir for increasing the area of fluid circulation within the reservoir.

2 Claims, 2 Drawing Figures

SPONTANEOUS CIRCULATION TYPE SOLAR HEAT COLLECTOR

FIELD OF THE INVENTION

The present invention relates to a spontaneous circulation type solar heat collector arrangement in which a hot water reservoir is connected directly to the interior of an evacuated double-tubing type solar heat tube, whereby a sufficient spontaneous convection takes place therebetween.

BACKGROUND OF THE INVENTION

So far, there have been available solar heat collectors of the type wherein the open ends of a plurality of heat collecting tubes terminate in the lower portion of the reservoir. Such collectors are also designed such that the heat collecting tubes inserted into the reservoir are provided in the sides with inflow openings, through which cold water on the bottom of the reservoir flows into said tubes, whereby a spontaneous convection takes place between cold water and hot water.

However, such a type of heat collector has the following disadvantages. Since the open ends of the heat collecting tubes are located within the reservoir, heated hot water circulates by convection to an insufficient extent, so that it remains substantially stagnant within the reservoir. In some cases, an extremely insufficient convection may take place depending upon the position at which the tubes are attached to the reservoir. In addition, the narrow system for heat circulation considerably deteriorates heat conduction. Furthermore, cold water on the bottom of the reservoir flows into the heat collecting tubes through the inflow openings, resulting in considerable energy loss. Thus, the conventional spontaneous convection type solar heat collector arrangements are still unsatisfactory in several points.

SUMMARY OF THE INVENTION

The present invention provides a solution to the problems of the prior art solar heat collectors. An object of the present invention is to provide a wider circulation system for the evacuated double-tubing type solar heat collecting tubes and the hot water reservoir, whereby improvements are introduced in thermal conductivity to reduce heat loss as much as possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above-mentioned and other objects and features of the present invention will become apparent from a reading of the following detailed description with reference to the drawings, in which.

DETAILED DESCRIPTION OF THE INVENTION

Figure 2:
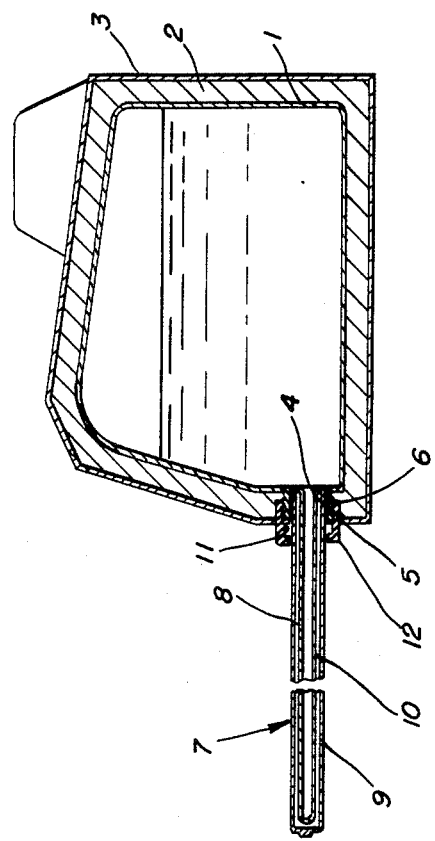
FIG. 2 is a longitudinally sectional view, partly cut-away, of the embodiment illustrated in FIG. 1.
Figure 1:
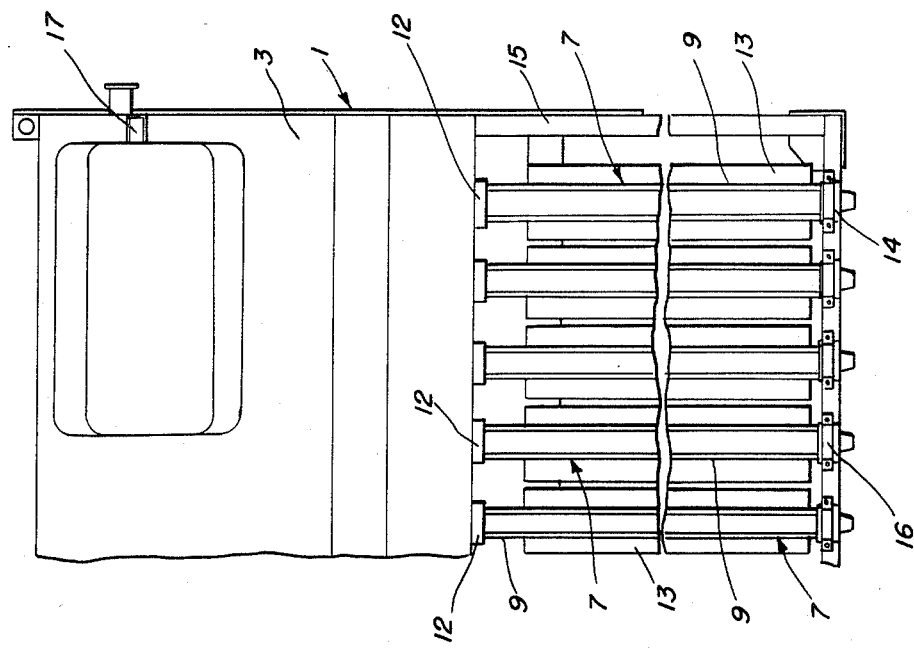
FIG. 1 is a partly cut-away plan view of one embodiment of the solar heat collector arrangement according to the present invention.

Referring now to the drawings, a hot water reservoir shown at 1 is provided therearound with a heat insulator 2 for protection and containment of the heat therein. The outer surface of the heat insulator 2 is retained by a frame 3. Connecting openings 4 for evacuated double-tubing type solar heat collecting tubes 7 are formed in the lower portion of the reservoir 1. As illustrated in FIG. 2, the member 5 includes external threads 6 which are fitted into the opening 4. The tubes 7 each comprise an inner pipe 8 being closed at one end and open at the other end, which is coaxially inserted through an outer pipe 9 being open at one end and closed at the other end as well as being of a different diameter. The open ends of the pipes 8 and 9 are air-tightly sealed off, and the space therebetween is evacuated. A selective absorption film 10 is applied over the outer surface of the inner pipe 8.

The open end of the tube 7 is inserted into the opening 4, and is positioned to be flush with the inner surface of the reservoir 1. A nut 12 is engaged with the threaded portion 6 of the member 5 through a packing 11 for providing a water-tight seal. It is noted that any sealing means may be used on condition that water-tight sealing is achieved.

Mirrors 13 are provided for separately guiding the sunlight toward the tubes 7, and end caps 14 are mounted at the ends of the tubes 7. A support frame 15 including fixing bands 16 are provided adjacent to the reservoir 1. A water supply hole 17 is formed in the upper portion of the reservoir 1.

The foregoing embodiment operates as follows. When water contained in the tubes is heated by sunlight, hot water within each tube 7 begins to convect spontaneously from the closed end to the open end, and enters the reservoir 1 through the associated opening 4. The hot water then circulates through the reservoir 1, and successively heats water stored therein.

Since the tube 7 is fixed to be positioned flush with the inner surface of the reservoir 1, a wide circulation system is defined within the reservoir 1, thus ensuring a sufficient spontaneous convection and extremely efficient heat conduction.

With the arrangement as described with reference to the drawings, the open ends of the heat collecting tubes are positioned flush with the inner surface of the reservoir. The interiors of the heat collecting tubes 7 are in direct communication with the reservoir to define a wider circulation system and effect an extremely efficient spontaneous convection between the tubes and the reservoir. Thus, the hot water contained in the heat-collecting tubes and heated by solar heat efficiently conducts its heat to the water stored in the reservoir by spontaneous convection.

In addition, since the heat-collecting tubes are fixedly inserted into the connecting openings in a water-tight sealing manner, effective heat exchange takes place without given rise to any heat loss from the fixed position, or the vicinity thereof, of the arrangement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A spontaneous convection type solar heat collector arrangement comprising:

a reservoir in which a fluid is disposed, said reservoir including an upper portion, a lower portion and an inner surface;

at least one double-tubing type solar heat collecting tube having an open end and a closed end;

at least one connecting opening being provided in the lower portion of said reservoir for mounting the open end of said double-tubing type solar heat collecting tube;

insulating means being operatively positioned around said reservoir for protecting and insulating said reservoir;

said open end of said double-tubing type solar heat collecting tube being positioned in a fixed fluid-tight manner to said connecting opening and being flush with the inner surface of said reservoir for increasing the area of fluid circulation within said reservoir;

an externally threaded member positioned within said connecting opening and an internally threaded nut;

said double-tubing type solar heat collecting tube being disposed within said externally threaded member and said threaded nut for affixing said open end of said double-tubing type solar heat collecting tube to be flush with the inner surface of said reservoir and a packing member operatively positioned between said externally threaded member and said nut for sealing said tube in said opening of said reservoir.

2. A spontaneous convection type solar heat collector arrangement according to claim 1, and further including a plurality of double-tubing type solar heat collecting tubes and a plurality of connecting openings being operatively disposed in the lower portion of said reservoir.

* * * * *